(12) United States Patent
Hatsuda et al.

(10) Patent No.: US 8,819,350 B2
(45) Date of Patent: Aug. 26, 2014

(54) MEMORY SYSTEM

(75) Inventors: Kosuke Hatsuda, Tokyo (JP); Daisaburo Takashima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 48 days.

(21) Appl. No.: 13/425,548

(22) Filed: Mar. 21, 2012

(65) Prior Publication Data

US 2012/0179863 A1 Jul. 12, 2012

Related U.S. Application Data

(63) Continuation of application No. PCT/JP2010/052119, filed on Feb. 5, 2010.

(30) Foreign Application Priority Data

Sep. 25, 2009 (JP) .................................. 2009-220349

(51) Int. Cl.
G06F 13/16 (2006.01)

(52) U.S. Cl.
USPC ............................ 711/150; 711/103; 711/148

(58) Field of Classification Search
None
See application file for complete search history.

(56) References Cited

U.S. PATENT DOCUMENTS

| 5,822,251 | A | 10/1998 | Bruce et al. |
| 7,173,863 | B2 | 2/2007 | Conley et al. |
| 8,539,174 | B2 * | 9/2013 | Hahn et al. .................... 711/154 |
| 2006/0227607 | A1 | 10/2006 | Park et al. |
| 2007/0198770 | A1 * | 8/2007 | Horii et al. .................... 711/103 |
| 2009/0132761 | A1 | 5/2009 | Yim et al. |
| 2009/0150894 | A1 | 6/2009 | Huang et al. |
| 2009/0172250 | A1 | 7/2009 | Allen et al. |
| 2009/0235015 | A1 | 9/2009 | Hatsuda et al. |

FOREIGN PATENT DOCUMENTS

| JP | P3688835 | 6/2005 |
| JP | 2007-48184 | 2/2007 |
| JP | 2007-528079 | 10/2007 |
| JP | 2008-217316 | 9/2008 |
| JP | 2009-048544 | 3/2009 |

OTHER PUBLICATIONS

Extended Search Report issued May 14, 2013 in European Patent Application No. 10818579.4.
Office Action issued Aug. 30, 2013, in Korean Patent Application No. 10-2012-7007121 with English translation.
First Examination Opinion issued May 17, 2013 in Taiwanese Patent Application No. 099108396 (with English translation).
Notice of Rejection issued May 21, 2013 in Japanese Patent Application No. 2009-220349 (with English translation).

(Continued)

Primary Examiner — Gary Portka
(74) Attorney, Agent, or Firm — Oblon, Spivak, McClelland, Maier & Neustadt, L.L.P.

(57) ABSTRACT

A memory system includes a plurality of storage groups, each of which includes a nonvolatile first storing unit and a second storing unit as a buffer memory of the first storing unit and is capable of performing data transfer between the first storing unit and the second storing unit, and a plurality of MPUs. A first control for data transfer between the host device and the first storing unit via the second storing unit for one of the storage groups and a second control including a control for maintenance of the first storing unit for other storage groups are allocated to the MPUs to be performed independently by the MPUs.

17 Claims, 9 Drawing Sheets

(56) References Cited

OTHER PUBLICATIONS

Interntaional Search Report mailed Jun. 29, 2010 in PCT/JP2010/052119 filed Feb. 5, 2010 in English.

International Searching Authority Written Opinion mailed Jun. 29, 2010 in PCT/JP2010/052119 filed Feb. 5, 2010 in English.

Office Action issued Nov. 22, 2013 in Taiwanese Patent Application No. 099108396 (with English language translation).

Combined Chinese Office Action and Search Report issued Jan. 30, 2014 in Patent Application No. 201080041759.4 with English Translation and English Translation of Category of Cited Documents.

* cited by examiner

MEMORY SYSTEM

CROSS-REFERENCE TO RELATED APPLICATIONS

This application is a continuation of PCT international application Ser. No. PCT/JP2010/052119 filed on Feb. 5, 2010 which designates the United States and claims the benefit of priority from Japanese Patent Application No. 2009-220349 filed on Sep. 25, 2009; the entire contents of which are incorporated herein by reference.

FIELD

Embodiments described herein relate generally to a memory system that includes a nonvolatile semiconductor memory.

BACKGROUND

Nowadays, a semiconductor memory is used in various fields such as a main storage of a large computer, a personal computer (PC), home electric appliances, and a cell phone. The rapidly growing market is a Flash-E2PROM type nonvolatile memory represented by a NAND flash memory, and various memory cards (a secure digital (SD) card, a multimedia card (MMC), a memory stick (MS) card, and a compact flash (CF) card) on which the NAND flash memory is mounted are used for a digital camera, a digital video, a music player such as a mpeg-1 audio layer 3 (MP-3) player, a storage medium of a mobile PC and the like, and a storage medium of a digital television set and the like as a medium that stores therein information on an image, a moving image, a sound, and a game. Moreover, a universal serial bus (USB) enabled card is also widely used as a storage medium for a PC.

The Flash-E$^2$PROM type nonvolatile memory mainly includes a NOR type and a NAND type. The NOR type can perform high-speed reading; however, the effective bandwidth in writing is small, so that it is not suitable for file recording. On the other hand, the NAND type can be highly integrated compared with the NOR type, and moreover can perform a burst read operation and the effective bandwidth in writing is high although the access speed is a little slow. Therefore, the NAND type is used in the memory cards described above and a USB memory, and is recently used in a memory of a cell phone and the like.

As described above, the NAND-type nonvolatile memory can realize large capacity and high integration and therefore is often considered to replace a hard disk. However, the NAND-type flash memory is a semiconductor memory that needs erasing processing before writing, and the life thereof depends on the number of times of rewriting. Moreover, because an erasing unit is large, in the typical use environment for a PC in which data to be handled is not always large-capacity data such as image data and a music file, fatigue of the NAND memory is accelerated.

Therefore, in the case of configuring a secondary storage with large capacity by using the NAND memory, a cache memory such as a random access memory (RAM) is often placed between a flash memory and a host device to reduce the number of times of writing (the number of times of erasing) in the flash memory as described in Japanese translation of PCT international application No. 2007-528079.

The secondary storage using such a NAND memory often includes a driving circuit that drives the NAND memory and a RAM and a microprocessor unit (MPU) that controls the driving circuit (for example, Japanese Patent No. 3688835).

In the conventional technology, because the NAND memory and the RAM are controlled by one MPU and one driving circuit, a problem arises in performance as a high-end storage for a server or the like.

Embodiments provides a memory system capable of applying to a high-end storage for a server or the like.

DETAILED DESCRIPTION

In general, according to one embodiment, a memory system comprising: a plurality of storage groups, each of which includes a first storing unit that is nonvolatile and includes a plurality of blocks as a unit of data erasing, a second storing unit as a buffer memory of the first storing unit, a first control circuit that controls driving of the first storing unit, and a second control circuit that controls driving of the second storing unit, and is capable of performing data transfer between the first storing unit and the second storing unit in each of the storage groups; an interface that is connected to a host device; and a plurality of MPUs that is bus-connected to the interface and the first control circuit and the second control circuit of each of the storage groups, and controls the first control circuit and the second control circuit of each of the storage groups, wherein a first control for data transfer between the host device and the first storing unit via the second storing unit for at least one of the storage groups and a second control including a control for maintenance of a first storing unit for other of the storage groups are allocated to the MPUs to be performed independently by the MPUs.

According to one embodiment, it is possible to provide a memory system that realizes speed-up of data transfer processing and improvement of a response speed and can be applied to a high-end storage for a server or the like. Exemplary embodiments of memory system will be explained below in detail with reference to the accompanying drawings. The present invention is not limited to the following embodiments.

(First Embodiment)

Figure 1:
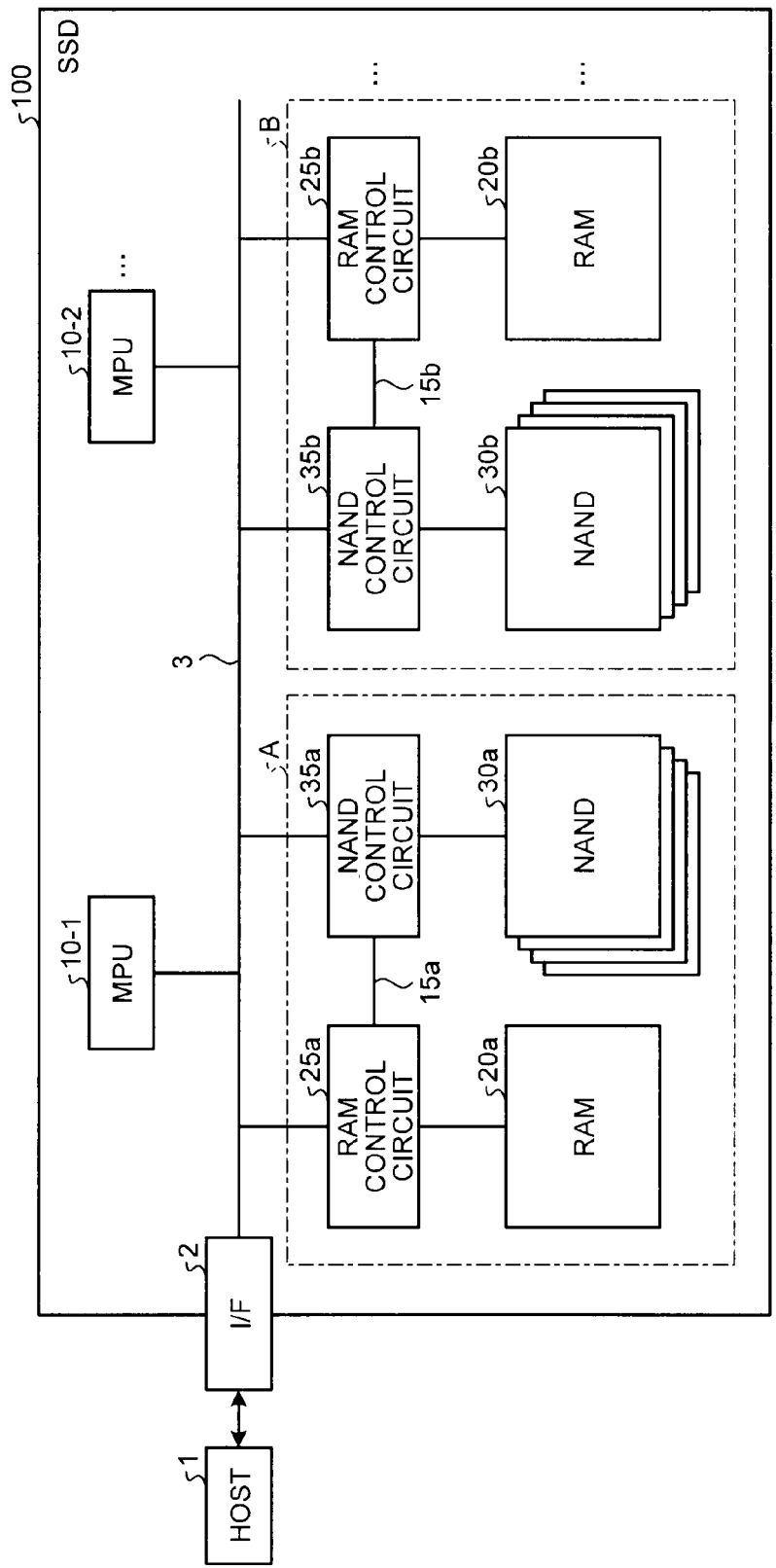
FIG. 1 is a block diagram illustrating a configuration example of a memory system according to a first embodiment.

FIG. 1 is a block diagram illustrating a configuration example of a solid state drive (SSD) 100 as a memory system according to the first embodiment. The SSD 100 includes a memory connection interface (I/F) such as an advanced technology attachment (ATA) I/F 2 to which a bus 3 is connected. The SSD 100 is connected to a host device (hereinafter, simply "host") 1 such as a PC or a central processing unit (CPU) core via the ATA I/F 2 and functions as an external memory of the host 1.

A plurality of MPUs 10-1, 10-2, . . . , a plurality of RAM control circuits 25a, 25b, . . . , and a plurality of NAND control circuits 35a, 35b, . . . are connected to the bus 3. A NAND-type flash memory (hereinafter, simply "NAND memory") 30a as a nonvolatile semiconductor memory is connected to the NAND control circuit 35a, a NAND memory 30b is connected to the NAND control circuit 35b, and NAND memories 30c, . . . are connected to NAND control circuits 35c, . . . , respectively. A RAM 20a as a buffer memory of the NAND memory 30a is connected to the RAM control circuit 25a, a RAM 20b as a buffer memory of the NAND memory 30b is connected to the RAM control circuit 25b, and RAMs 20c, . . . are connected to RAM control circuits 25c, . . . , respectively. The RAM control circuit 25a and the NAND control circuit 35a are connected also by a dedicated line 15a in addition to the bus 3. In the similar manner, the RAM control circuit 25b and the NAND control circuit 35b are connected also by a dedicated line 15b, and the RAM control circuits 25c, . . . and the NAND control circuits 35c, . . . are connected also by dedicated lines 15c, . . . , respectively.

In the following explanation, the SSD 100 includes two MPUs 10-1 and 10-2, two RAMs 20a and 20b, two NAND memories 30a and 30b, two RAM control circuits 25a and 25b, and two NAND control circuits 35a and 35b.

The NAND memories 30a and 30b store therein user data designated by the host 1, management information managed in the RAMS 20a and 20b for backup, and the like. The NAND memories 30a and 30b each include a memory cell array in which a plurality of memory cells is aligned in a matrix manner, and each memory cell can perform multivalue storage by using an upper page and a lower page. The NAND memories 30a and 30b each include a plurality of memory chips. Each memory chip is configured by aligning a plurality of physical blocks as a unit of data erasing. Moreover, the NAND memories 30a and 30b each perform writing and readout of data in units of physical page. The physical block includes a plurality of physical pages.

The RAMs 20a and 20b can be a volatile RAM such as a dynamic random access memory (DRAM) or can be a nonvolatile RAM such as a ferroelectric random access memory (FeRAM) and a magnetoresistive random access memory (MRAM). The RAMs 20a and 20b are used as a storing unit for data transfer and management information recording. As the storing unit (cache for data transfer) for data transfer, the RAMs 20a and 20b are used for temporarily storing data for which a write request is received from the host 1 before writing it in the NAND memory or for reading out data for which a read request is received from the host 1 from the NAND memory and temporarily storing it. Moreover, as the storing unit for management information recording, the RAMs 20a and 20b are used for storing various management information (various management tables, log as change difference information of the management tables, and the like) for managing a storing position of data backed up in the NAND memory, and the like.

The RAM control circuit 25a performs interface processing with the MPUs 10-1 and 10-2 and the RAM 20a, a read/write control to the RAM 20a, and the like. The RAM control circuit 25b performs interface processing with the MPUs 10-1 and 10-2 and the RAM 20b, a read/write control to the RAM 20b, and the like.

The NAND control circuit 35a performs interface processing with the MPUs 10-1 and 10-2 and the NAND memory 30a, a data transfer control between the NAND memory 30a and the RAM 20a, encode/decode processing of an error correction code, and the like. The NAND control circuit 35b performs interface processing with the MPUs 10-1 and 10-2 and the NAND memory 30b, a data transfer control between the NAND memory 30b and the RAM 20b, encode/decode processing of an error correction code, and the like.

The RAM 20a and the NAND memory 30a are connected by a plurality of channels, so that a parallel data transfer by using these channels can be performed. Moreover, the NAND memory 30a is divided into a plurality of banks, and a parallel operation by the bank interleave using these banks can be performed between the RAM 20a and the NAND memory 30a. In the similar manner, the RAM 20b and the NAND memory 30b are connected by a plurality of channels, so that a parallel data transfer by using these channels can be performed. Moreover, in the similar manner, the NAND memory 30b is divided into a plurality of banks, and a parallel operation by the bank interleave using these banks can be performed between the RAM 20b and the NAND memory 30b. The host 1 can basically access all of the user memory spaces excluding a management area in which the management information such as the management tables and the like are stored out of all of the memory spaces constituted by the two NAND memories 30a and 30b.

In the first embodiment, a storage group A includes the RAM 20a, the NAND memory 30a, the RAM control circuit 25a, and the NAND control circuit 35a, and the data transfer can be performed only between the RAM 20a and the NAND memory 30a in the storage group A. A storage group B includes the RAM 20b, the NAND memory 30b, the RAM control circuit 25b, and the NAND control circuit 35b, and the data transfer can be performed only between the RAM 20b and the NAND memory 30b in the storage group B. The MPU 10-1 can access the storage groups A and B and the MPU 10-2 can also access the storage groups A and B.

In the first embodiment, the processing functions to be performed by the MPUs 10-1 and 10-2 are fixedly allocated. If the processing functions are fixedly allocated to each of the MPUs 10-1 and 10-2, a firmware that is operated on each MPU can be made easy and simplified. The MPU 10-1 basically performs processing (data transfer between IF-RAM-NAND) related to read/write processing requested from the host 1 for one of the storage groups A and B. The MPU 10-2 basically performs processing other than the read/write processing requested from the host 1 for the other one of the storage groups A and B. The processing other than the read/write processing includes maintenance processing (including wear leveling processing, refresh processing, and garbage collection processing) of the NAND memory for the other storage group, flush processing from the RAM to the NAND memory, and native command queuing (NCQ) processing.

Figure 2:
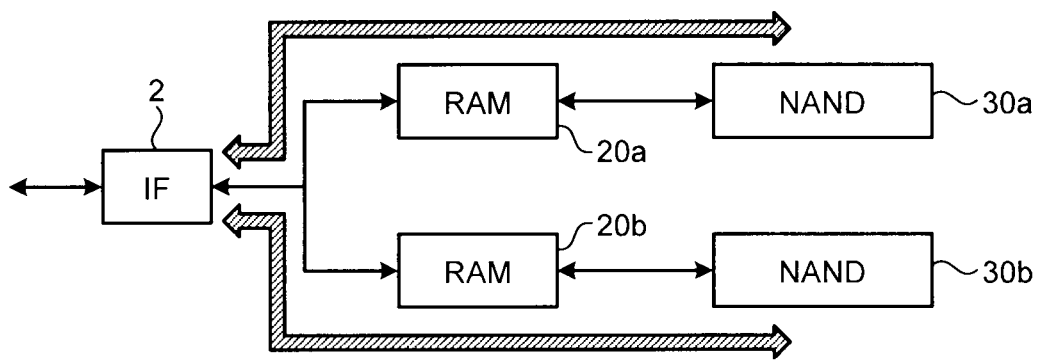
FIG. 2 is a schematic diagram illustrating a data transferring form of a RAM and a NAND memory according to the first embodiment.

When the processing functions are not fixedly allocated to each of the MPUs 10-1 and 10-2 and one of the MPUs performs the read/write processing, the other MPU on standby can perform the above processing other than the read/write processing. In this case, when one of the MPUs performs the processing other than the read/write processing, the other MPU performs the read/write processing. In this manner, in the first embodiment, as shown in FIG. 2, the storage group A including the RAM 20a and the NAND memory 30a and the storage group B including the RAM 20*b* and the NAND memory 30*b* can perform different processings independently and in parallel.

The NAND-type flash memory is a semiconductor memory on which erasing processing needs to be performed before writing, and the life thereof depends on the number of times of rewriting. On the other hand, the data recorded by the host 1 has both temporal locality and spatial locality. Therefore, when data is recorded, if the data is directly recorded in an address designated from the host 1, rewriting, i.e., the erasing processing temporally concentrates in a short time in a specific area and a bias in the number of times of erasing increases. Therefore, in the NAND-type flash memory, processing called the wear leveling for equally distributing data update sections is performed. In the wear leveling processing, the number of times of rewriting is caused to distribute equally between blocks to prevent concentration of writing and erasing on a specific erasing unit (block). In a static wear leveling, a block on which rewriting is not performed for a long time and of which number of times of rewriting is small is exchanged for a block of which number of times of rewriting is large. For example, when the MPU 10-1 causes the storage group A to perform the data transfer between IF-RAM-NAND, the MPU 10-2 causes the storage group B to perform the wear leveling processing in parallel therewith. Whereby, the data transfer processing speed and the response speed can be increased in the system as a whole.

In the NAND-type flash memory, data stored in a memory cell transistor is inverted in some cases with the elapse of time. The refresh processing is processing of reading out data in a memory cell and writing it in a different cell to prevent this inversion. For example, when the MPU 10-1 causes the storage group A to perform the data transfer between IF-RAM-NAND, the MPU 10-2 causes the storage group B to perform the refresh processing in parallel therewith. Whereby, the data transfer processing speed and the response speed can be increased in the system as a whole.

In the NAND memory, a concept of a virtual block called a logical block in which a plurality of physical blocks is combined is introduced, and erasing, writing, and readout are performed in units of this physical block. When the data erasing (logical block) unit is different from the data managing unit, according to the progress of rewriting of the NAND memory, logical blocks are made porous by invalid data. When the logical blocks in such a porous state increase, substantially usable logical blocks decrease and a storage area of the NAND memory cannot be effectively used. Therefore, processing called compaction for collecting valid data and rewriting it in a different logical block is performed. The garbage collection processing includes such compaction processing. For example, when the MPU 10-1 causes the storage group A to perform the data transfer between IF-RAM-NAND, the MPU 10-2 causes the storage group B to perform the garbage collection processing in parallel therewith. Whereby, the data transfer processing speed and the response speed can be increased in the system as a whole.

The flush processing from the RAM to the NAND memory is processing of flushing data in a cache area to the NAND memory before or when the cache area of the RAM becomes full. For example, when the MPU 10-1 causes the storage group A to perform the data transfer between IF-RAM-NAND, the MPU 10-2 causes the storage group B to perform the flush processing in parallel therewith. Whereby, the data transfer processing speed and the response speed can be increased in the system as a whole.

The NCQ processing is processing of storing commands to the NAND memory in a queue and performing the commands while changing the order thereof. When the MPU 10-1 performs the read/write processing, the MPU 10-2 performs the NCQ processing. Whereby, the data transfer processing speed and the response speed can be increased in the system as a whole.

The management tables managed by the MPU include a table for managing the cache area in the RAM, a table for managing a storing position of data in the NAND memory, a table for managing a free block, a table for managing a block in use, a table for managing a block that cannot be used as a storage area because of a large number of errors or the like, and a table for managing the number of times of rewriting of each block. The management information includes a log as the change difference information of the management tables in addition to these management tables. Such management information is stored in the RAMs 20*a* and 20*b*. The management information for the storage group A can be stored in the RAM 20*a* of the storage group A and the management information for the storage group B can be stored in the RAM 20*b* of the storage group B, or the management information for the storage group A can be stored in the RAM 20*b* of the storage group B and the management information for the storage group B can be stored in the RAM 20*a* of the storage group A.

In the case where the management information for the storage group A is stored in the RAM 20*b* of the storage group B and the management information for the storage group B is stored in the RAM 20*a* of the storage group A, when the MPU 10-1 causes the storage group A to perform the data transfer between IF-RAM-NAND, the MPU 10-2 can perform update of the management information for the data transfer between IF-RAM-NAND performed in the storage group A on the RAM 20*b* of the storage group B in parallel therewith. Whereby, the data transfer processing speed and the response speed can be increased in the system as a whole.

Next, the selection between the storage groups A and B in write processing (data transfer between IF→RAM→NAND) performed in the MPU 10-1 is explained. The method of selection includes the followings:

(a) Switching based on Free Space of RAM (b) Switching based on Degree of Fatigue (Number of Times of Rewriting) of NAND Memory (c) Switching based on whether Data smaller than Page Unit is present in Cache Area of RAM (d) Switching considering Locality (whether it is address in which data is updated frequently) of Logical Address (LBA) designated from Host The switching of (a) is explained. In the case where the write request is received from the host 1, the MPU 10-1 checks the free space of each cache area of the RAMs 20*a* and 20*b* and writes data from the host 1 to one of the RAMs with a larger free space. For example, when the RAM 20*a* is full of valid data, the data from the host 1 is written in the RAM 20*b*. According to this switching processing, unnecessary flush processing from the RAM to the NAND memory is reduced and the probability of high-speed response to the write request from the host 1 is increased.

The switching of (b) is explained. In the case where the write request is received from the host 1, the MPU 10-1 judges whether the write size of this write request is large and further judges which one of the NAND memories 30*a* and 30*b* has a higher degree of fatigue by obtaining the average of the number of times of rewriting of each of the NAND memories 30*a* and 30*b*. Then, the MPU 10-1 causes the RAM of the storage group that includes the NAND memory having a higher degree of fatigue to write the data with a large write size and causes the RAM of the storage group that includes the NAND memory having a lower degree of fatigue to write the data with a small write size. In the NAND memory in which the data with a small write size is written, the garbage collection increases and consequently the number of times of rewriting of a block increases, so that the data with a large write size is written in the NAND memory having a higher degree of fatigue. Whereby, the life of the NAND memory is extended, enabling to improve reliability.

The switching of (c) is explained. In the case where the write request is received from the host 1, when there is data of which size is smaller than the writing unit (page) of the NAND memory in the RAM 20*a*, the MPU 10-1 preferentially selects the RAM 20*a* and causes the data from the host 1 to be written in the selected RAM 20*a* to generate data larger than the writing unit (page) of the NAND memory. Whereby, the flushing is performed after large data is stored in the RAM, and writing efficiency is improved and speed-up and reliability are improved. The writing efficiency means a statistical value of an erasing amount of the logical block with respect to a data amount written from the host in a predetermined period.

The switching of (d) is explained. In the case where the write request is received from the host 1, the MPU 10-1 judges whether the write request is a write request for the logical address that is updated (used) frequently. In the case where it is an address that is used frequently, the MPU 10-1 causes one of the RAMs to write the data. In the case where it is not an address that is used frequently, the MPU 10-1 causes the other RAM to write the data. Whereby, the purpose of the RAMs becomes clear, so that the management tables can be optimized (minimized) and the flush processing can be optimized.

Figure 3:
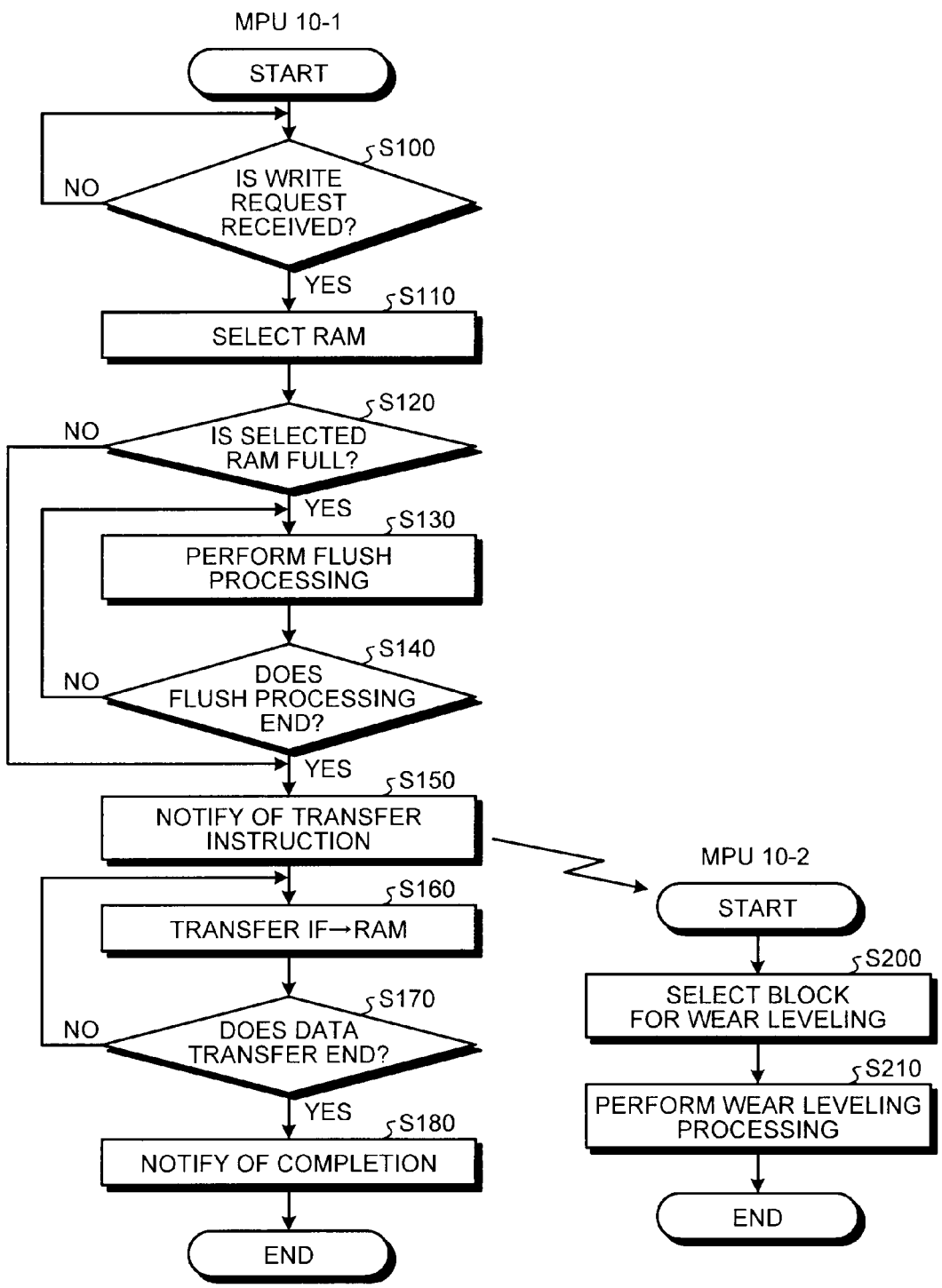
FIG. 3 is a flowchart illustrating an operation example according to the first embodiment.

Next, with reference to the flowchart shown in FIG. 3, processing is explained when the write processing is performed in one of the storage groups and the wear leveling processing is performed in the other storage group in parallel therewith. When the write request is received from the host 1 (Step S100), the MPU 10-1 performs the judgment of the above (a) to (d) to judge in which RAM the data from the host 1 is to be written (Step S110). In this example, it is judged that the data is written in the RAM 20*a*.

Next, the MPU 10-1 judges whether the selected RAM 20*a* is full (Step S120). When it is judged that the selected RAM 20*a* is full, the flush processing from the RAM 20*a* to the NAND memory 30*a* is performed (Step S130). When the flush processing is performed, the end of the flush processing is notified to the bus 3 from the NAND control circuit 35*a*. When it is detected that the selected RAM 20*a* is not full or the notification of the end of the flush processing is detected, the MPU 10-1 notifies the host 1 of the transfer instruction of the write data via the bus 3 (Step S150).

The data transfer from the host 1 to the RAM 20*a* is started by this transfer instruction notification (Step S160). When the MPU 10-1 receives the end of the data transfer from the I/F 2 to the RAM 20*a* from the RAM control circuit 25*a* (Step S170), the MPU 10-1 transmits the completion notification to the host 1 via the bus 3 (Step S180). Thereafter, the MPU 10-1 is on standby until receiving a request from the host 1.

On the other hand, when the MPU 10-2 detects the transfer instruction notification from the MPU 10-1 to the host via the bus 3, the MPU 10-2 selects a block on which the static wear leveling needs to be performed from the NAND memory 30*b* with the detection of the transfer instruction notification as a trigger (Step S200). Then, the MPU 10-2 performs the static wear leveling processing of exchanging a block of which number of times of rewriting is small for a block of which number of times of rewriting is large on the NAND memory 30*b* (Step S210). In this manner, the write processing and the wear leveling processing are performed in parallel. Specially, when the flush processing performed at Step S130 does not need to be performed in the RAM 20*a*, the wear leveling in the NAND memory 30*b* can be started earlier, so that the write processing and the wear leveling processing can be parallelized efficiently.

Figure 4:
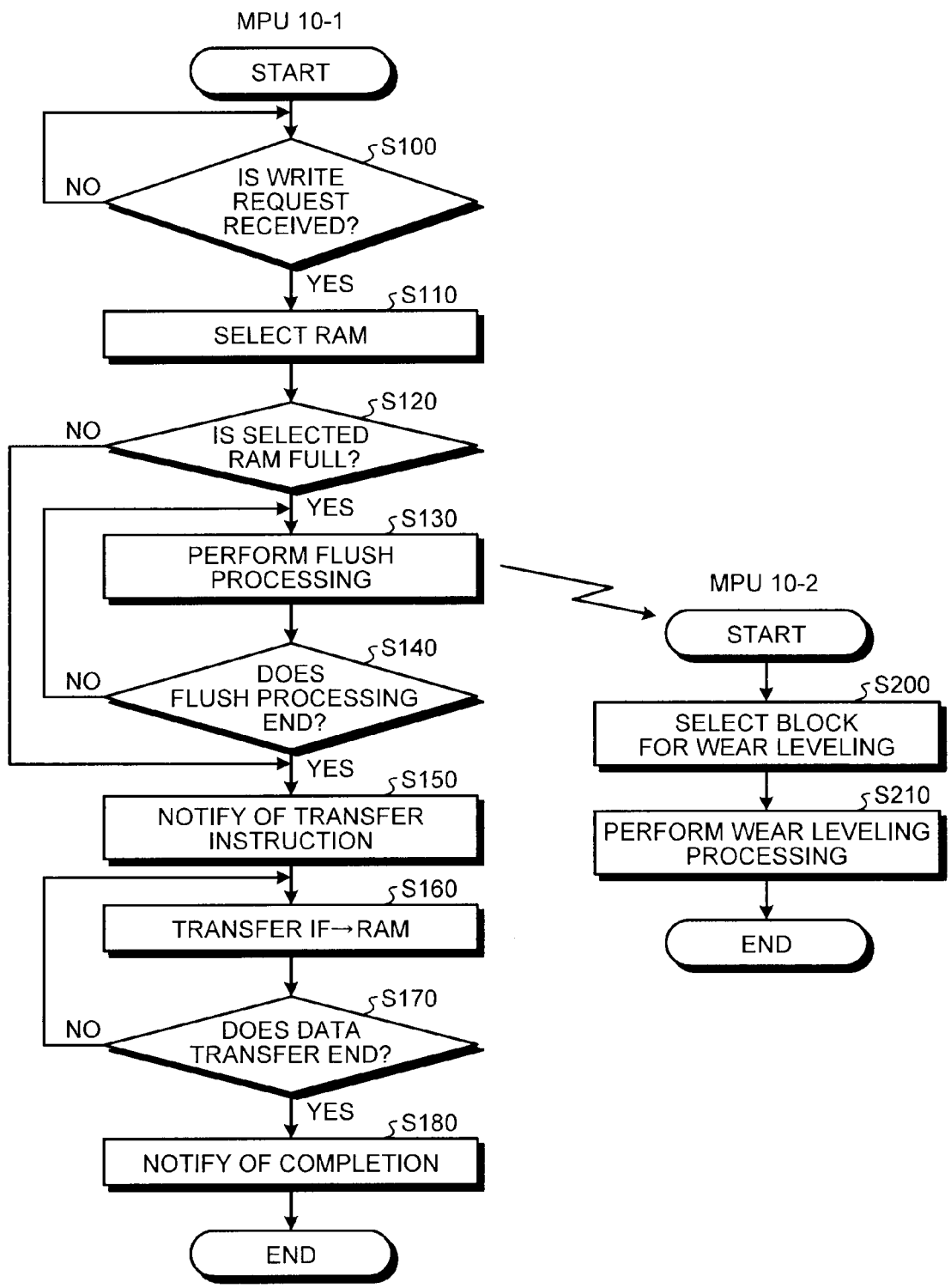
FIG. 4 is a flowchart illustrating an operation example according to the first embodiment.

In the above explanation, the static wear leveling processing is performed after detecting the transfer instruction notification (Step S150); however, as shown in FIG. 4, when the MPU 10-2 detects that the flush processing (Step S130) by the MPU 10-1 is performed, the MPU 10-2 can select a block on which the static wear leveling needs to be performed from the NAND memory 30*b* with the detection of the flush processing as a trigger (Step S200). Then, the MPU 10-2 performs the static wear processing of exchanging a block of which number of times of rewriting is small for a block of which number of times of rewriting is large on the NAND memory 30*b* (Step S210). In this manner, the write processing and the wear leveling processing are performed in parallel. According to such a control, the write processing and the wear leveling processing can be parallelized efficiently.

Figure 5:
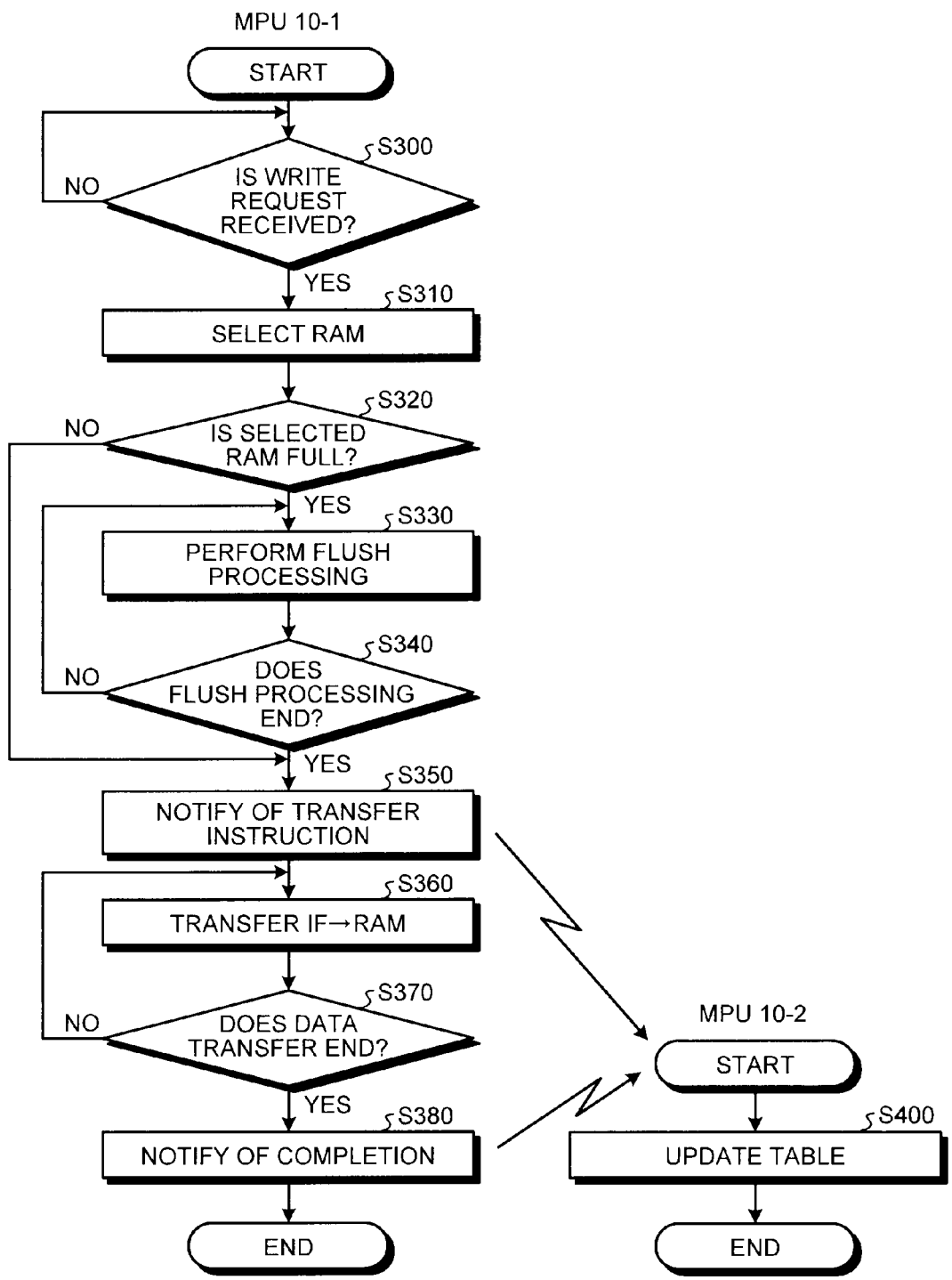
FIG. 5 is a flowchart illustrating another operation example according to the first embodiment.

Next, an operation example when the write processing and the table update processing are performed in parallel is explained with reference to the flowchart shown in FIG. 5. In this operation example, the management information related to the storage group A is stored in the RAM 20*b* of the storage group B and the management information related to the storage group B is stored in the RAM 20*a* of the storage group A.

When the write request is received from the host 1 (Step S300), the MPU 10-1 performs the judgment of the above (a) to (d) to judge in which RAM the data from the host 1 is to be written (Step S310). In this example, it is judged that the data is written in the RAM 20*a*.

Next, the MPU 10-1 judges whether the selected RAM 20*a* is full (Step S320). When it is judged that the selected RAM 20*a* is full, the flush processing from the RAM 20*a* to the NAND memory 30*a* is performed (Step S330). When the flush processing is performed, the end of the flush processing is notified to the bus 3 from the NAND control circuit 35*a*. When it is detected that the selected RAM 20*a* is not full or the notification of the end of the flush processing is detected, the MPU 10-1 notifies the host 1 of the transfer instruction of the write data via the bus 3 (Step S350).

In this example, the flush processing is performed at Step S330. When the MPU 10-2 detects the transfer instruction notification from the MPU 10-1 to the host via the bus 3, the MPU 10-2 causes the RAM 20*b* of the storage group B to perform update of the management information attributed to the flush processing from the RAM 20*a* to the NAND memory 30*a* performed at Step S330 with the detection of the transfer instruction notification as a trigger (Step S400). In other words, the management table related to the storage group A is stored in the RAM 20*b* of the storage group B and the MPU 10-2 updates the management table related to the storage group A stored in the RAM 20*b*.

Moreover, the data transfer from the host 1 to the RAM 20*a* is started by the transfer instruction notification at Step S350 (Step S360). When the MPU 10-1 receives the end of the data transfer from the I/F 2 to the RAM 20*a* from the RAM control circuit 25*a* (Step S370), the MPU 10-1 transmits the completion notification to the host 1 via the bus 3 (Step S380). Thereafter, the MPU 10-1 is on standby until receiving a request from the host 1.

When the MPU 10-2 detects the completion notification from the MPU 10-1 to the host 1, the MPU 10-2 causes the RAM 20*b* of the storage group B to perform update of the management table attributed to the data transfer processing between IF-RAM related to the storage group A with the detection of the completion notification as a trigger (Step S400).

In this manner, in the first embodiment, the data transfer processing between IF-RAM-NAND in one storage group and the control related to the maintenance of the NAND memory of the other storage group are allocated to a plurality of MPUs to be performed independently, so that the average speed of the system can be improved. Moreover, the management information is stored in a RAM of a different storage group and the data transfer processing between IF-RAM-NAND in one storage group and the update processing of the management information related to the data transfer processing between the IF-RAM-NAND are allocated to the MPUs to be performed independently, so that the average speed of the system can be improved. Furthermore, the data transfer processing between IF-RAM-NAND in one storage group and the flush processing for the other storage group are allocated to the MPUs to be performed independently, so that the average speed of the system can be improved.

(Second Embodiment)

Figure 6:
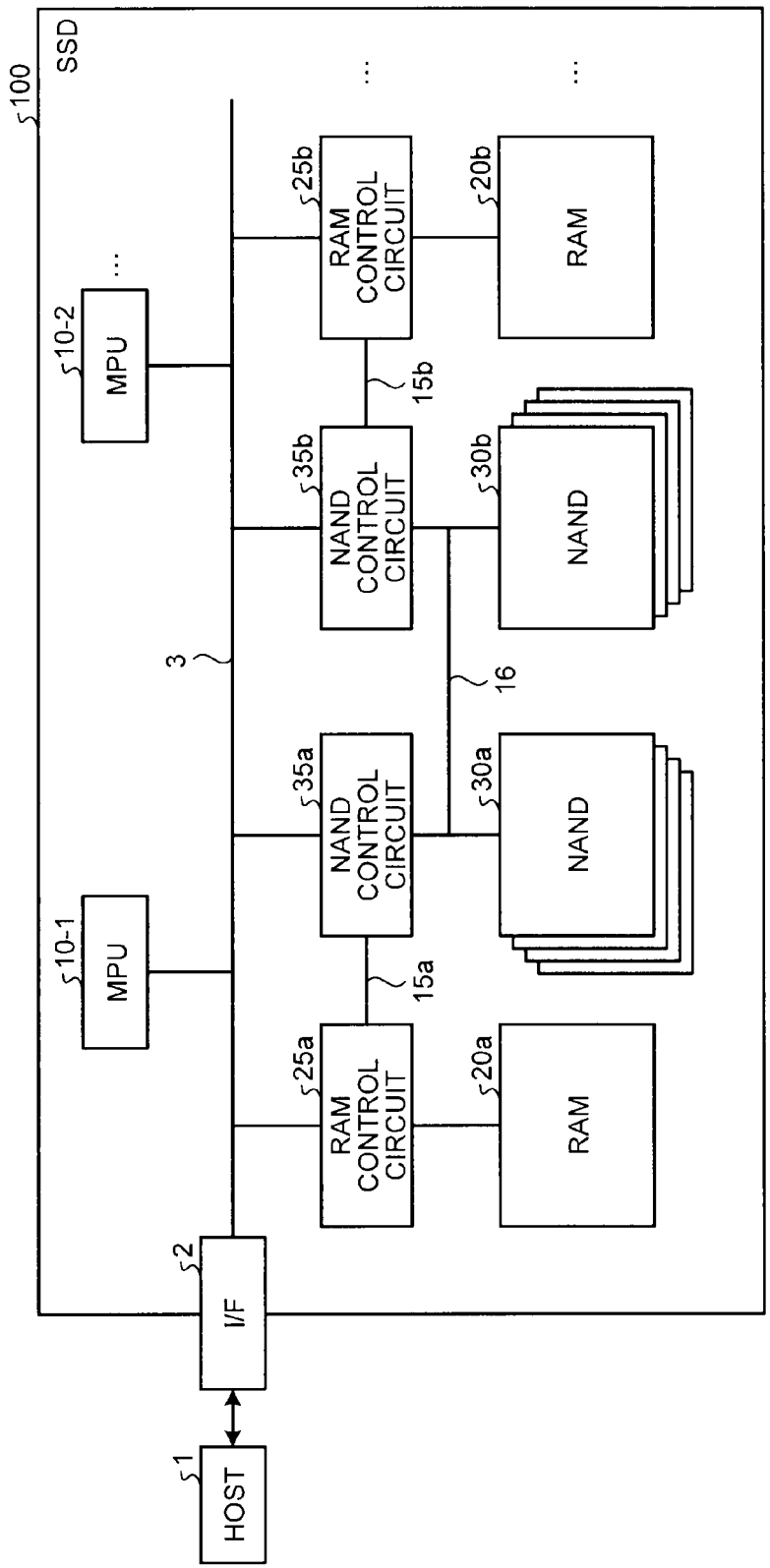
FIG. 6 is a block diagram illustrating a configuration example of a memory system according to a second embodiment.

FIG. 6 is a block diagram illustrating a configuration example of the SSD 100 as the memory system according to the second embodiment. In the SSD in the second embodiment, clear grouping is not performed. The SSD includes a storage unit that includes a plurality of the RAMs 20a, 20b, . . . , a plurality of the RAM control circuits 25a, 25b, . . . , a plurality of the NAND memories 30a, 30b, . . . , and a plurality of the NAND control circuits 35a, 35b, . . . . The NAND control circuit 35a can access the NAND memories 30a and 30b by a dedicated line 16 and the NAND control circuit 35b can also access the NAND memories 30a and 30b by the dedicated line 16.

Figure 7:
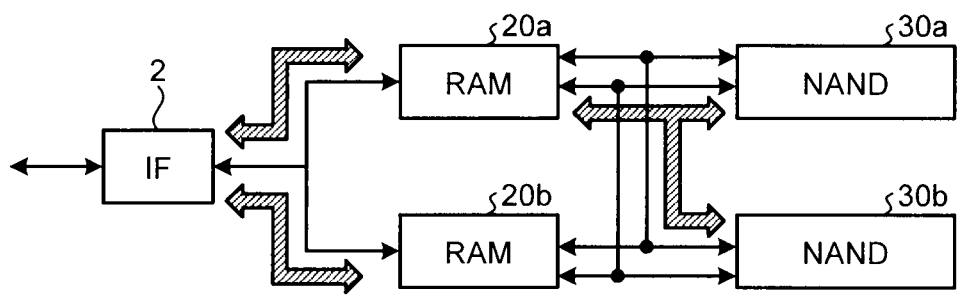
FIG. 7 is a schematic diagram illustrating a data transferring form of a RAM and a NAND memory according to the second embodiment.

In the SSD in the second embodiment, as shown in FIG. 7, one RAM and a plurality of NAND memories can be activated at the same time and perform the data transfer, and a different RAM can access the NAND memories. In other words, the data transfer can be performed between the RAM 20a and the NAND memories 30a and 30b and between the RAM 20b and the NAND memories 30a and 30b.

In the second embodiment, because the parallelism of the NAND memories is improved, the transfer speed from the RAM to the NAND memory increases and the table update processing can be performed in the RAM that is not used during the transfer. Moreover, when the read/write processing is performed in the MPU 10-1, the MPU 10-2 can perform the NCQ processing.

Furthermore, in the second embodiment, in selecting the RAM for the data transfer, it is possible to perform the switching based on the free space of the RAM, the switching based on whether data smaller than the page unit is present in the cache area of the RAM, and the like. In the second embodiment, the processing functions to be performed by the MPUs 10-1 and 10-2 can be fixedly allocated. Alternatively, when one of the MPUs performs the read/write processing, the other MPU on standby can perform the processing other than the read/write processing.

In this manner, in the second embodiment, because the band width between the RAM and the NAND memory is large, the data transfer between the RAM and the NAND memory can be speeded up and processing in the RAM that is not used during the data transfer can be performed.

(Third Embodiment)

Figure 8:
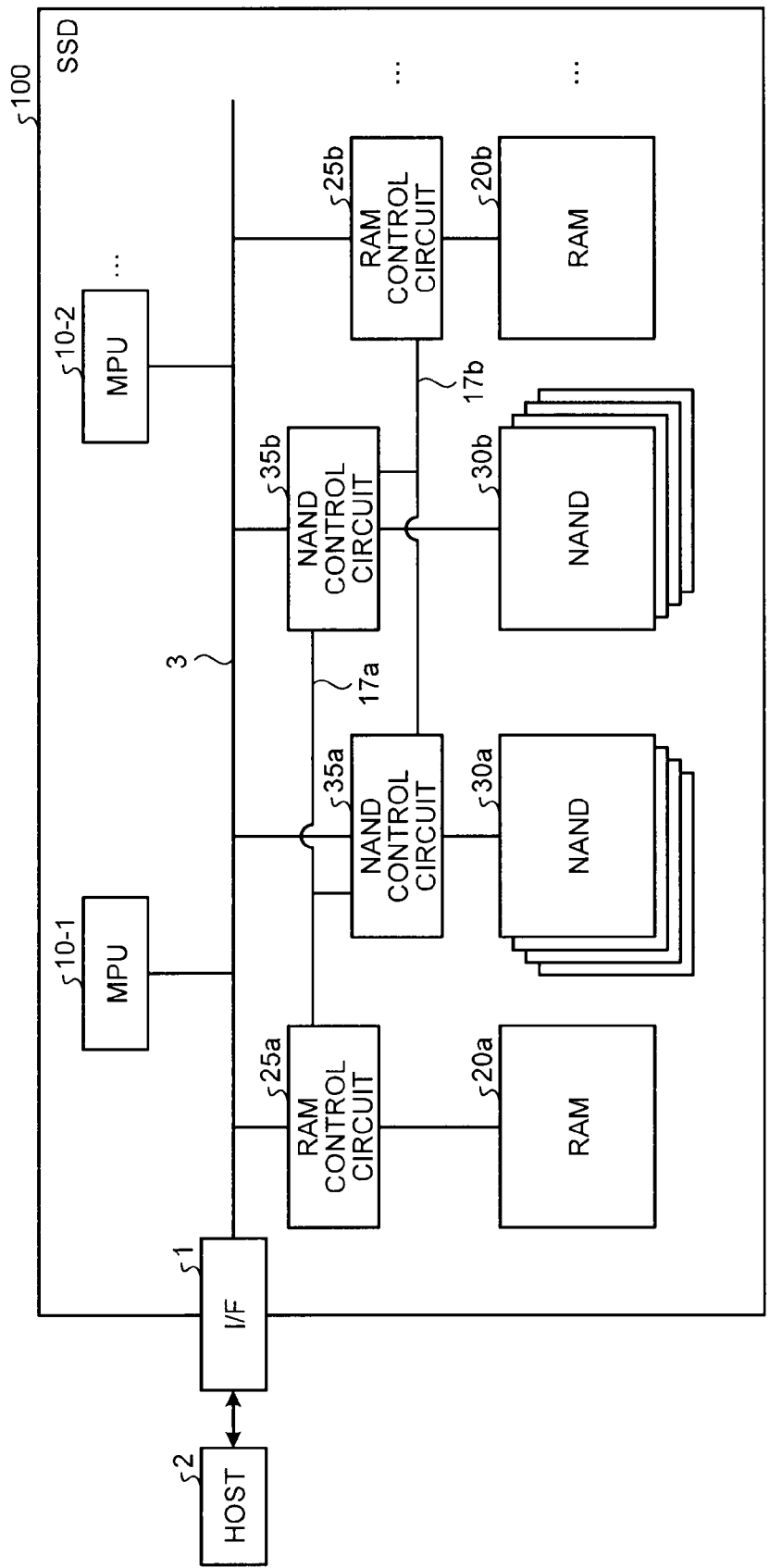
FIG. 8 is a block diagram illustrating a configuration example of a memory system according to a third embodiment.

FIG. 8 is a block diagram illustrating a configuration example of the SSD 100 as the memory system according to the third embodiment. In the SSD in the third embodiment also, clear grouping is not performed. The SSD includes a storage unit that includes a plurality of the RAMs 20a, 20b, . . . , a plurality of the RAM control circuits 25a, 25b, . . . , a plurality of the NAND memories 30a, 30b, . . . , and a plurality of the NAND control circuits 35a, 35b, . . . .

Figure 9:
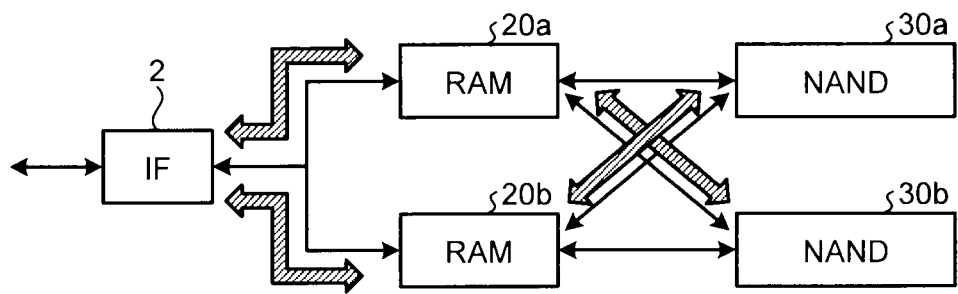
FIG. 9 is a schematic diagram illustrating a data transferring form of a RAM and a NAND memory according to the third embodiment.

In the third embodiment, the NAND control circuit 35a can only access the NAND memory 30a and the NAND control circuit 35b can only access the NAND memory 30b in the similar manner to FIG. 1. However, as shown in FIG. 8, the RAM control circuit 25a is connected to the NAND control circuits 35a and 35b by a dedicated line 17a and the RAM 20a can perform the data transfer independently to both of the NAND memories 30a and 30b. Moreover, the RAM control circuit 25b is connected to the NAND control circuits 35a and 35b by a dedicate line 17b and the RAM 20b can perform the data transfer independently to both of the NAND memories 30a and 30b. Therefore, the SSD in the third embodiment can select one of a plurality of the NAND memories hanging from a plurality of the NAND control circuits and access the selected NAND memory from the RAM as shown in FIG. 9. Thus, in the system shown in FIG. 8, for example, when the data stored in the RAM is flushed to the NAND memory, the NAND memory can be flexibly selected, so that it is possible to select the NAND memory having a high flushing efficiency and perform processing (the wear leveling processing, the refresh processing, and the like) between the NAND memories.

In the third embodiment, all of the parallel processing that can be performed in the first embodiment can be performed. The parallel processing includes the followings:

(a) Parallelization of Data Transfer Processing between IF-RAM-NAND and Maintenance Processing (b) Parallelization of Data Transfer Processing between IF-RAM-NAND and Flush Processing (c) Parallelization of Data Transfer Processing between IF-RAM-NAND and NCQ Processing (d) Parallelization of Data Transfer Processing between IF-RAM-NAND and Table Update Processing The table update processing is performed by using the RAM that is not used in the data transfer processing.

Moreover, in the third embodiment, when the RAM for the data transfer (write processing) is selected, it is possible to perform all of the switching explained in the first embodiment, i.e., the switching based on the free space of the RAM, the switching based on the degree of fatigue (the number of times of rewriting) of the NAND memory, the switching based on whether the data smaller than the page unit is present in the cache area of the RAM, and the switching considering the locality of the logical address (LBA) designated from the host.

When performing the switching based on the free space of the RAM, the MPU selects the RAM with a larger free space and writes data from the host 2 in the selected RAM. When performing the switching based on the degree of fatigue of the NAND memory, the MPU selects the NAND memory in which data is written based on the degree of fatigue of the NAND memories 30a and 30b and the data size in the writing. When performing the switching based on whether the data smaller than a page unit is present in the cache area of the RAM, the MPU judges whether data smaller than the page unit is present in the RAMs 20a and 20b, preferentially selects the RAM in which the data smaller than the page unit is present, and causes the data from the host 2 to be written in the selected RAM. When performing the switching considering the locality of the logical address (LBA) designated from the host, the MPU, when the address is used frequently, causes a predetermined one of the RAMs and the NAND memory to write the data, and, when the address is not used frequently, causes a predetermined one of the other RAMs and the NAND memory to write the data.

In the third embodiment, the processing functions to be performed by the MPUs 10-1 and 10-2 can be fixedly allocated. Alternatively, when one of the MPUs performs the read/write processing, the other MPU on standby can perform the processing other than the read/write processing.

In the third embodiment, the NAND memory on which the maintenance is performed and data is easily written can be selected and the refresh or the wear leveling can be performed with a different NAND memory, so that the high-speed data transfer can be performed and reliability can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a plurality of storage groups, each of which includes a first storing unit that is nonvolatile and includes a plurality of blocks as a unit of data erasing, a second storing unit as a buffer memory of the first storing unit, a first control circuit that controls driving of the first storing unit, and a second control circuit that controls driving of the second storing unit, the storage groups being capable of data transfer between the first storing unit and the second storing unit in each of the storage groups;
an interface that is connected to a host device; and
a plurality of MPUs that is bus-connected to the interface and the first control circuit and the second control circuit of each of the storage groups, and controls the first control circuit and the second control circuit of each of the storage groups, wherein
a first MPU among the MPUs performs data transfer between the host device and the first storing unit of a first storage group among the storage groups via the second storing unit of the first storage group, and a second MPU among the MPUs performs maintenance control of the first storing unit of a second storage group among the storage groups when the second MPU detects a transfer instruction notification from the first MPU to the host device.

2. The memory system according to claim 1, wherein the maintenance control includes at least one of wear leveling processing, garbage collection processing, and refresh processing.

3. The memory system according to claim 1, wherein the first MPU performs data transfer between the host device and the first storing unit via the second storing unit of the first storage group, wherein
the second MPU performs control for data flush from the second storing unit of the second storage group to the first storing unit of the second storage group when the second MPU detects the transfer instruction notification from the first MPU to the host device.

4. The memory system according to claim 1, wherein the second storing unit of the second storage group stores therein management information for managing data stored in the first storing unit and the second storing unit of the first storage group, wherein
the first MPU performs data transfer between the host device and the first storing unit of the first storage group via the second storing unit of the first storage group, wherein
the second MPU updates the management information when the second MPU detects the transfer instruction notification from the first MPU to the host device.

5. The memory system according to claim 3, wherein the second storing unit of the second storage group stores therein management information for managing the data stored in the first storing unit and the second storing unit of the first storage group, wherein
the first MPU performs data transfer between the host device and the first storing unit of the first storage group via the second storing unit of the first storage group, wherein
the second MPU updates the management information when the second MPU detects the transfer instruction notification from the first MAU to the host device.

6. The memory system according to claim 1, wherein the first MPU selects, from among the storage groups, the first storage group, based on free space on the second storing unit, degree of fatigue of the first storing unit capable of data transfer with the second storing unit, an address designated from the host device, or whether data smaller than a writing unit of the first storing unit, is present in the second storing unit.

7. A memory system comprising:
a plurality of storage groups, each of which includes a first storing unit that is nonvolatile and includes a plurality of blocks as a unit of data erasing, a second storing unit as a buffer memory of the first storing unit, a first control circuit that controls driving of the first storing unit, and a second control circuit that controls driving of the second storing unit, the storage groups being capable of data transfer between the first storing unit and the second storing unit in each of the storage groups;
an interface that is connected to a host device; and
a plurality of MPUs that is bus-connected to the interface and the first control circuit and the second control circuit of each of the storage groups, and controls the first control circuit and the second control circuit of each of the storage groups, wherein
a first MPU among the MPUs performs data transfer between the host device and the first storing unit a first storage group among the storage groups via the second storing unit of the first storage group, and a second MPU among the MPUs flushes data from the second storing unit of a second storage group among the storage groups to the first storing unit of the second storage group when the second MPU detects a transfer instruction notification from the first MPU to the host device.

8. A memory system comprising:
a plurality of storage groups, each of which includes a first storing unit that is nonvolatile and includes a plurality of blocks as a unit of data erasing, a second storing unit as a buffer memory of the first storing unit, a first control circuit that controls driving of the first storing unit, and a second control circuit that controls driving of the second storing unit, the storage groups being capable of data transfer between the first storing unit and the second storing unit in each of the storage groups;
an interface that is connected to a host device; and
a plurality of MPUs that is bus-connected to the interface and the first control circuit and the second control circuit of each of the storage groups, and controls the first control circuit and the second control circuit of each of the storage groups, wherein a second MPU among the MPUs stores, into the second storing unit of a second storage group among the storage groups, management information for managing data stored in the first storing unit of a first storage group among the storage groups and the second storing unit of the first storage group, wherein a first MPU among the MPUs performs a first control for data transfer between the host device and the first storing unit of the first storage group via the second storing unit of the first storage group, and the second MPU performs a second control for update processing of the management information attributed to the first control when the second MPU detects a transfer instruction notification from the first MPU to the host device.

9. A memory system comprising:

a storage unit that includes a plurality of first storing units that is nonvolatile and includes a plurality of blocks as a unit of data erasing, a plurality of second storing units as a buffer memory of the first storing units, a plurality of first control circuits that controls driving of the first storing units, and a plurality of second control circuits that controls driving of the second storing units, the storage unit being capable of data transfer between one of the second storing units and the first storing units;

an interface that is connected to a host device; and a plurality of MPUs that is bus-connected to the interface and the first control circuits and the second control circuits of the storage unit, and controls the first control circuits and the second control circuits of the storage unit, wherein a first MPU among the MPUs performs a first control for data transfer between the host device and the first storing units via one of the second storing units, and a second MPU among the MPUs performs a second control including processing using the second storing unit that is not used for the first control when the second MPU detects a transfer instruction notification from the first MPU to the host device.

10. The memory system according to claim 9, wherein the second MPU stores, into the second storing unit that is not used for the first control, management information for managing data stored in the first storing unit and the second storing unit, and the second MPU performs the second control for update processing of the management information.

11. A memory system comprising a storage unit that includes a plurality of first storing units that is nonvolatile and includes a plurality of blocks as a unit of data erasing, a plurality of second storing units as a buffer memory of the first storing units, a plurality of first control circuits that controls driving of the first storing units, and a plurality of second control circuits that controls driving of the second storing units, the storage unit being capable of data transfer between one of the second storing units and one of the first storing units;

an interface that is connected to a host device; and a plurality of MPUs that is bus-connected to the interface and the first control circuits and the second control circuits of the storage unit, and controls the first control circuits and the second control circuits of the storage unit, wherein a first MPU among the MPUs performs a first control for data transfer between the host device and one of the first storing units selected from the first storing units via one of the second storing units selected from the second storing units, and a second MPU among the MPUs performs a second control including a control for maintenance of the first storing unit that is not used for the first control when the second MPU detects a transfer instruction notification from the first MPU to the host device.

12. The memory system according to claim 11, wherein the second control includes data flushing from the second storing unit that is not used for the first control, to the first storing unit that is not used for the first control.

13. The memory system according to claim 11, wherein the second MPU stores, into the second storing unit that is not used for the first control, management information for managing data stored in the first storing unit and the second storing unit, and the second MPU performs the second control for update processing of the management information.

14. The memory system according to claim 11, wherein when writing data from the host device to the first storing unit via the second storing unit, the first MPU selects the second storing unit with a large free space.

15. The memory system according to claim 11, wherein when writing the data from the host device to the first storing unit via the second storing unit, the first MPU selects the first storing unit, based on degree of fatigue of the first storing unit and a size of the data to be written.

16. The memory system according to claim 11, wherein when writing the data from the host device to the first storing unit via the second storing unit, the first MPU judges whether data smaller than a writing unit of the first storing unit, is present in the second storing unit, and preferentially selects the second storing unit in which the data smaller than the writing unit of the first storing unit, is present.

17. The memory system according to claim 11, wherein when writing the data from the host device to the first storing unit via the second storing unit, the first MPU judges whether the writing is writing for a logical address that is used frequently, and selects the first storing unit and the second storing unit according to a result of the judgment.

* * * * *